United States Patent [19]

Goodson et al.

[11] Patent Number: 5,494,514
[45] Date of Patent: Feb. 27, 1996

[54] WEATHER RESISTANT SOIL CEMENT

[75] Inventors: Russell L. Goodson, Denver; Gary J. Colaizzi, Lakewood; Brian Masloff, Westminster; Joseph J. Feiler, Littleton, all of Colo.

[73] Assignee: Goodson & Associates, Inc., Lakewood, Colo.

[21] Appl. No.: 259,478

[22] Filed: Jun. 14, 1994

[51] Int. Cl.⁶ .................................................. C04B 38/00
[52] U.S. Cl. .......................... 106/677; 106/672; 106/679; 106/681; 106/705; 106/706; 106/708; 106/719; 106/724; 106/803; 106/816; 106/820; 106/800; 405/266; 405/267
[58] Field of Search .................................. 106/672, 677, 106/681, 705, 706, 708, 719, 724, 737, 803, 812, 816, 820, 900, 679, 802; 405/266, 267

[56] References Cited

U.S. PATENT DOCUMENTS

| | | | |
|---|---|---|---|
| 3,887,506 | 6/1975 | Hewitt. | |
| 3,979,217 | 9/1976 | Sutton | 106/681 |
| 4,077,809 | 3/1978 | Plunguian. | |
| 4,082,562 | 4/1978 | Litvan et al. | 106/681 |
| 4,545,820 | 10/1985 | Mallow | 106/900 |
| 4,871,283 | 10/1989 | Wright | 405/263 |
| 4,900,359 | 2/1990 | Gelbman | 106/681 |
| 4,941,924 | 7/1990 | Merritt | 106/900 |
| 4,965,097 | 10/1990 | Bach | 428/194 |
| 5,109,030 | 4/1992 | Chao et al. | 521/83 |
| 5,110,839 | 5/1992 | Chao | 521/83 |
| 5,183,505 | 2/1993 | Spinney | 106/672 |

Primary Examiner—Mark L. Bell
Assistant Examiner—Michael Marcheschi
Attorney, Agent, or Firm—Kyle W. Rost

[57] ABSTRACT

A weather resistant soil cement with an open pore structure for resisting freeze-thaw damage is formed of cement, fly ash, Free aggregates, water, and an aqueous foamed surfactant, and other application specific additives. The material is uniquely suited for using indigenous soils, mill tailings, or granular waste products as the aggregate component of the mixture, although commercially produced aggregates may be used depending on economics and availability. Due to its low density and flowable nature, it can be pumped or placed by gravity and without compaction. The resulting product is a low density material with construction and mining applications, that is suited for use as a fill or mad base. Specific product formulations are easily designed to permit removal at local sites with conventional excavating equipment.

9 Claims, No Drawings

WEATHER RESISTANT SOIL CEMENT

TECHNICAL FIELD

The invention generally relates to hydraulic and earth engineering, especially earth treatment and control, especially by chemical means, and more specifically by cementitious chemicals applied by mixing, expansion, and placement. Another aspect of the invention relates to road structure, process and apparatus, especially to a process for treatment of earth or roadway by soil stabilization. A further aspect of the invention generally relates to cellular products in the area of synthetic resins, especially to cellular products or processes of preparing a cellular product, e.g. foams, pores, channels, etc. More specifically, the invention relates to extruding a solid polymer containing material to form a cellular product, in which an ingredient is water settable inorganic material, e.g., cement.

BACKGROUND ART

In the past, soil cements have been used to stabilize road bases. However, prior known soil cements are susceptible to freeze-thaw cycles. Soil cements cannot be made impermeable to moisture penetration. Some soils such as clays and silts absorb large quantities of water. In addition, they often are poorly graded, allowing for significantly increased void space between the aggregate particles, which enhances permeability. When these soils are used to make soil cements, they become quite susceptible to freeze-thaw cycles, since no mechanism exists within the material to dissipate the internal pressure created by freezing water.

The process used in the creation and placement of soil cements is quite difficult and time consuming. To achieve the proper soil cement, the soil used must be as close to laboratory optimum moisture content as possible. Then, the typical soil cement must be compacted during placement to achieve the required bearing capabilities.

Several patents disclose soil stabilizing compounds and methods. For example, U.S. Pat. No. 4,871,283 to Wright discloses a soil cement for in-situ treatment and stabilization of subsurface soils by multiple point injection of a mixture of lime and fly ash in a slurry, which may incorporate additional cement and bentonite. This product and method strengthens the soil layers and controls the movement of subsurface water. Some of the specific uses of this compound are building roadbeds and stabilizing slopes. An apparent advantage of this technology is that the native soil layers were not first removed and then replaced. However, the Wright patent offers no solution to the freeze-thaw problem that inheres in soil cements.

U.S. Pat. No. 5,110,839 to Chao teaches a stabilized foam with fine pore sizes. This foam is used in light weight, cellular, cementitious products, especially building materials and structures where soundproofing, fire resistance, and decreased water permeability are desired. To the extent this technology might be used for road beds or soil stabilization, it is apparent that improving water resistance cannot be a long term solution. A similar scope is found U.S. Pat. No. 5,109,030 to the same inventor.

U.S. Pat. No. 4,077,809 to Plunguian et al discloses another stabilized foam for use in cellular concrete product designed for fire proofing, thermal insulation, and soundproofing. Air cells in various cementitious mixtures are stabilized by addition of an admixture of a water soluble organic film former, an emulsion of a synthetic resin, a mixture of anionic and non-ionic surfactants, and air to produce a stabilized foam. Foams of this type typically have a small, fine pore structure.

U.S. Pat. No. 4,965,097 to Bach discloses an earth confinement material that employs plastic, texturized strips to form air cells that hold fill material, such as of cement and aggregate.

Various surfactants have been used in soil stabilizing compounds. U.S. Pat. No. 4,545,820 to Mallow discloses a soil stabilizing compound that includes Portland cement, a hydrated alkali metal silicate powder and various other components necessitated by the presence of free water in the soil. The object is to stabilize indigenous soils for use in trench back fill and in road surfaces and subsurfaces. The compound has improved water resistance, which, as noted, is not a satisfactory solution to freeze-thaw problems. Further, this compound requires mechanical compaction after placement, which is undesirable.

U.S. Pat. No. 4,941,924 to Merritt teaches a chemical composition for stabilizing cohesive soils in roadbeds. The composition includes a large percentage of sulfuric acid and citrus stripper oil, and after application it must be compacted. The use of such chemicals on a roadway, coupled with mechanical compaction, is undesirable.

U.S. Pat. No. 3,887,506 to Hewitt discloses another formulation for stabilizing soils, such as road beds, by improving pavement sub-grades. The chemical applied is a combination of water diluted vinyl acetate polymer, a water repellant, and plasticizers, which are sprayed on native soils, mixed into the soil using typical road working equipment and mechanically compacted. The resultant sub-grade surface has increased compressive strength and decreased permeability. While this formulation might stabilize soils, it does not appear to stabilize the soil cement itself against typical freeze-thaw damage.

In light of the absence of a soil cement that, itself, is stable against freeze-thaw damage, it would be desirable to create a soil cement that incorporates an inherent release mechanism for internal hydraulic pressures, such as those pressures caused by freeze-thaw cycles, poorly graded materials, and water absorbing materials like clays.

Further, it would be desirable to create a soil cement that eliminates the mechanical compaction step associated with typical road base sub-grade enhancement, soil stabilization, geo-technical fills and trench back filling.

Since a road base may involve a large volume of material, it would be desirable to reduce cement content while increasing weather resistance and durability, as compared to standard lightweight concrete products.

Similarly, it would be desirable to use indigenous soils, certain granular waste products such as mill tailings, and commercially available aggregates as the aggregate portion of a mixture.

To achieve the foregoing and other objects and in accordance with the purpose of the present invention, as embodied and broadly described herein, the product and method of application of this invention may comprise the following.

DISCLOSURE OF INVENTION

Against the described background, it is therefore a general object of the invention to provide an improved soil cement that is weather resistant, incorporating a mechanism for releasing internal hydraulic pressures when subjected to freeze-thaw conditions.

A more specific object is to provide a soil cement that can incorporate native soils, commercial aggregates, mine or mill tailings, or the like in a mix, such that the mix is economical for use in large scale projects.

Another object is to provide a soil cement mix formulation that can meet typical strength requirements while containing relatively little cement. An important object is to provide a mix formulation for soil cement that utilizes a relatively fast draining foam to cream a porous structure in a set product that is strong enough for its intended purposes.

A further object is to cream a soil cement formulation that can be placed by gravity and acquires its strength by setting, such that no compaction step is required.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a weather resistant cellular soil cement product is formed by a mixture of cement components in the quantity range from 0.5 to eight sacks per cubic yard of product; aggregate in the size range from gravelly sand to minus 200 mesh; water in quantity sufficient to create a water-to-cement ratio in the approximate range from 0.25 to 20.0 and sufficient to wet the aggregate; and surfactant; wherein prior to mixing, the surfactant is formed into a foam in the weight range of from approximately 25 to 40 grams per liter, and the foam is mixed with the cement component, aggregate, and water to form the product.

According to another aspect of the invention a method of forming a weather resistant cementitious product includes the steps of mixing the combination of a cement component in the quantity range from 0.5 to eight sacks per cubic yard of product with a free aggregate ranging in size from gravelly sand to minus 200 mesh particles such as clays and silts and with water in a water-to-cement ratio of about 0.25 to 20.0 and in quantity sufficient to wet the aggregate, as well as to thoroughly disperse the cement component and create a homogeneous, flowable paste. This flowable paste is mixed with a foam formed of a surfactant and water, having a weight range of approximately 25 to 40 grams per liter, to form the product. The product is placed in location to set.

BEST MODE FOR CARRYING OUT THE INVENTION

The creation of a weather resistant soil cement presents a problem seldom addressed in the geotechnical engineering field. Stabilizing the soil, itself, presents substantial difficulties due to variations in soil types, topography and climate. However, there are instances when the cement, rather than the soil, can fail; for example, due to instability caused by the effects of the freeze-thaw cycle. This invention is directed to a stable, economical, and highly functional soil cement product that is suited to a wide range of applications. Among the most notable is as a pavement sub-base, especially desirable in alpine, arctic and other cold regions where the freeze-thaw cycle can cause severe road heave in a single season. Other applications are in backfilling underground voids, such as mines, subsidence cavities, and shaft caps and plugs.

The product of this invention is a soil cement containing a substantial quantity of an unstabilized aqueous foam. The foam performs several functions that cause this product to perform in the desired manner. First, the foam expands the volume of the soil cement to create an internal pore structure for the desired weather resistance. Second, the quantity of foam influences the density and strength of the product to enable this product to meet specific task strength criteria while, in many formulations, still allowing spot removal of the product with conventional excavation equipment. Third, the foam creates a fluidized mix that can be pumped to the location for placement and allows the mix to be placed by gravity. The combination of these characteristics make the cellular soil cement a unique and highly functional product suited for a wide variety of applications, as will be described in detail.

In particular, the soil cement is an aqueous formulation consisting of a cementitious compound, small or fine, solid aggregate particles, and a stiff foam. Together, these ingredients form a flowable, relatively low density mixture, as compared to concrete. The density reduction varies in the range from about 5% to about 200%, as compared to the final dry density of the equivalent formulation without the added foam. This corresponds to a density reduction from about 130 lbs/cu. ft. to about 45 lbs/cu. ft. When allowed to set, the resulting solid product is characterized by a cellular structure that achieves an ultimate compressive strength in the range of 15 to 2500 psi, depending upon cement content, aggregate characteristics and foam content.

Proportioning of weather resistant soil cement mixtures typically is done in accordance with the absolute volume method of calculating quantities. This method uses the specific gravities of the various mix components in the calculation to determine the volume of each component relative to their respective weights. Specifically, the volume of mixed concrete is equal to the sum of the absolute volumes of cement, water (exclusive of that in the aggregate), aggregates, admixtures where applicable, and air. The absolute volume is computed from a material's weight and specific gravity using the formula:

$$\frac{\text{Absolute}}{\text{volume}} = \frac{\text{Weight of material}}{\text{Specific gravity of material} \times \text{unit weight of water}}$$

Absolute volume usually is expressed in cubic feet.

In certain cases, the specific gravity of an aggregate or other component will not lead to a correct result if used in the absolute volume calculation. This occurs, for example, with the use of an aggregate material, containing organic materials, such as indigenous soils; with highly absorbent materials, such as clays; and with natural or manufactured lightweight aggregates, such as pumice and expanded shales. In these cases, if the specific gravity of the aggregate were used in an absolute volume calculation, it would not accurately .reflect the volume of the aggregate material, since the materials contain air voids or the contained organics have a different specific gravity than the soil material carrying them. Poorly graded aggregates are characterized by particles that are relatively uniform in shape and size, which form substantially greater interstitial space compared to a well graded aggregate. This results in a significant amount of void space in the mix and, thus, a lower density. When air voids are present, an absolute volume calculation based on specific gravity would be inaccurate because a portion of the calculated water component is absorbed into the voids in the aggregate without changing the volume. In the case of organics, part of the volume of the aggregate is occupied by the organic material, which has a much lower specific gravity than the bulk of the aggregate. In these situations, the aggregate is tested and its unit weight or bulk density is determined according to appropriate ASTM specifications. The bulk density is used in the absolute volume calculation for proportioning the various materials in the final mixture.

The unit weight, or bulk density of an aggregate, is the weight of the material required to fill a container of a specified volume. This volume is filled by a combination of both the aggregate particles and void spaces between the particles. In addition, the aggregate particles themselves may contain voids which will absorb water. Various ASTM methods for determining unit weight are applicable, depending upon the material characteristics. One technique for determining the bulk density of an aggregate material is performed in accordance with ASTM C 29 standard test methods. This procedure consists of obtaining a sample and oven-drying it to remove excess moisture. Then, a vessel of known volume is filled with the dry material in three lifts, each of which is rodded or compacted in a specified manner. Next, the surface of the aggregate is leveled at the top of the vessel, using a straight edge. Finally, the vessel is weighed to determine the mass of the aggregate material. The bulk density or unit weight is determined according to the following formula:

$$M=(G-T)/V$$

where:

M=unit weight of the aggregate, in lb./cu. ft.

G=mass of the aggregate plus the vessel, in lb.

T=mass of the vessel, in lb.

V=volume of the vessel, in cu. ft.

For use in the absolute volume calculation, the aggregate should be in the saturated surface dry condition. This means the material is fully saturated but is not contributing free water to the rest of the mix. The bulk density saturated surface dry condition is calculated as follows:

$$MSSD=M[1+(A/100)]$$

where:

MSSD=unit weight of the aggregate in saturated surface dry condition, in lb./cu. ft.

A=% absorption, determined in accordance with ASTM test method C 127 or 128.

MSSD can be used in the absolute volume calculation to determine proper proportions of all mix components.

A first part of the composition is a water and cement mixture, with cement components ranging in quantity from 0.5 to eight sacks, or 47 to 752 pounds, per cubic yard of product and a water to cement ratio of about 0.25 to 20.0. The water-to-cement ratio is very wide due to the wide range of potential aggregates and applications of the product. For example, at the lower end of the stated range, it is possible to use a mixture of well graded, washed sand as aggregate, at 4% optimum moisture, together with 300 to 400 lbs of cement, expanded with foam for use as a flowable fall. In contrast, at the upper end of the range, it is possible to use a mixture of very fine, poorly graded material, a very small mount of cement, and very little foam for similar purposes in another situation. The very fine aggregate requires significantly more water due to the greatly increased surface area. The water and cement mixture includes portland cement and may include, optionally, a portion of class C fly ash. Typically, class C fly ash may compose from about 10% of cement content to 100% of the cement content. The following example discloses a formulation employing fly ash:

EXAMPLE 1—SAMPLE MIX FOR FLY ASH CONTENT

Cement and Fly Ash Mixture With Sand

Void Filling—130 Psi

| MIX WT Lb. | CONTENT | ABSL VOL Cu. Ft. | DENSITY Lb/Cu Ft | SG | UNIT WT Water |
| --- | --- | --- | --- | --- | --- |
| 313 | Cement | 1.5924 | 196.56 | 3.15 | 62.4 |
| 588 | Fly Ash | 4.20673 | 139.776 | 2.24 | 62.4 |
| 3015 | Aggregate | 18.2329 | 165.36 | 2.65 | 62.4 |
| 185 | H$_2$O, Base Mix | 2.9647 | 62.4 | 1 | 62.4 |
| 81.3 | Foam | 34.2864 | 2.3712 | 0.038 | 62.4 |

Base Mix Volume: 26.9968 Cu. Ft.

Desired Expansion: 120%

Desired Volume: 59.3930 Cu. Ft.

Foam Volume: 32.3962 Cu. Ft.

Expanded Volume: 61.2832: Ct. Ft.

Weight of Base Mix: 4101.0 Lbs.

Weight of Expanded Mix: 4182.3 Lbs.

A second component is aggregate in the size range from gravelly sand to minus 200 mesh particles such as clays and silts. The aggregate may be commercially produced or a native material, for example indigenous soil material, mill tailings, or class F fly ash. A particular advantage of this soil cement is the ability to make a useful product while using non-commercial, native aggregates, such as indigenous soils. Therefore, general reference to aggregates used in this product includes native materials, although the use of commercial aggregates is acceptable. The mix can be selected by use of known evaluation techniques.

The following examples show two sample soil cement mix designs with cement and water content held constant.

EXAMPLE 2—SAMPLE BASE MIX FOR AGGREGATE CONTENT

Mill Tailings From Galena Processing

SG=3.65

| MIX WT Lb. | CONTENT | ABSL VOL Cu. Ft. | DENSITY Lb/Cu Ft | SG | UNIT WT Water |
| --- | --- | --- | --- | --- | --- |
| 188 | Cement | 0.9565 | 196.56 | 3.15 | 62.4 |
| 0 | Fly Ash | 0 | 139.776 | 2.24 | 62.4 |
| 3800 | Aggregate | 16.6842 | 227.76 | 3.65 | 62.4 |
| 584 | H$_2$O, Base Mix | 9.3590 | 62.4 | 1 | 62.4 |
| 0.0 | Foam | 0.0000 | 2.3712 | 0.038 | 62.4 |

Base Mix Volume: 26.9997 Cu. Ft.

EXAMPLE 3—SAMPLE BASE MIX FOR AGGREGATE CONTENT

Native Material With Some Organics—Silty Sand

SG=2.35

| MIX WT Lb. | CONTENT | ABSL VOL Cu. Ft. | DENSITY Lb/Cu Ft | SG | UNIT WT Water |
|---|---|---|---|---|---|
| 188 | Cement | 0.9565 | 196.56 | 3.15 | 62.4 |
| 0 | Fly Ash | 0 | 139.776 | 2.24 | 62.4 |
| 445 | Aggregate | 16.6735 | 146.64 | 2.35 | 62.4 |
| 584 | H$_2$O, Base Mix | 9.3590 | 62.4 | 1 | 62.4 |
| 0.0 | Foam | 0.0000 | 2.3712 | 0.038 | 62.4 |

Base Mix Volume: 26.9889 Cu. Ft.

The only variable is aggregate type. In Example 2, the aggregate is a fairly typical native sandy soil, poorly graded and containing organics, with a bulk specific gravity of 2.35. Example 3 is a hypothetical mill tailing waste material from mineral processing with a specific gravity of 3.65 (pure galena SG=7.4 to 7.6). From these two examples it can be seen that the specific gravity of each material bears directly on the absolute volume calculation and the quantity of each in pounds. Each mix makes 27 cubic feet or 1 cubic yard. The comparison also assumes that the material gradations are approximately the same, so no other adjustments are necessary to compensate for differing surface areas. In practice, lab testing would be conducted on each material to determine optimum water content based on aggregate size and type.

The following examples disclose quantity ranges of aggregate content versus water content for gravelly sand. When the material type is held constant, the component that affects the water content is the cement content. The following two examples are given for the approximate low and high ends of cement content.

EXAMPLE 4—SAMPLE BASE MIX FOR GRAVELLY, SAND CONTENT

Gravelly Sand—Few Fines

Low Cement

| MIX WT Lb. | CONTENT | ABSL VOL Cu. Ft. | DENSITY Lb/Cu Ft | SG | UNIT WT Water |
|---|---|---|---|---|---|
| 47 | Cement | 0.2391 | 196.56 | 3.15 | 62.4 |
| 0 | Fly Ash | 0 | 139.776 | 2.24 | 62.4 |
| 3880 | Aggregate | 23.4640 | 165.36 | 2.65 | 62.4 |
| 204 | H$_2$O, Base Mix | 3.2692 | 62.4 | 1 | 62.4 |
| 0.0 | Foam | 0.0000 | 2.3712 | 0.038 | 62.4 |

Base Mix Volume: 26.9723 Cu. Ft.

EXAMPLE 5—SAMPLE BASE MIX FOR GRAVELLY SAND CONTENT

Gravelly Sand—Few Fines

High Cement

| MIX WT Lb. | CONTENT | ABSL VOL Cu. Ft. | DENSITY Lb/Cu Ft | SG | UNIT WT Water |
|---|---|---|---|---|---|
| 752 | Cement | 3.8258 | 196.56 | 3.15 | 62.4 |
| 0 | Fly Ash | 0 | 139.776 | 2.24 | 62.4 |
| 3030 | Aggregate | 18.3237 | 165.36 | 2.65 | 62.4 |
| 302 | $H_2O$, Base Mix | 4.8397 | 62.4 | 1 | 62.4 |
| 0.0 | Foam | 0.0000 | 2.3712 | 0.038 | 62.4 |

Base Mix Volume: 26.9892 Cu. Ft.

The water to cement ratio and the optimum moisture of the aggregates are held constant at 0.2 and 5%, respectively. With these criteria, the aggregate content varies from 3880 lbs to 3030 lbs, while water varies from 204 lbs to 302.lbs. Innumerable combinations are possible.

The following two examples disclose quantity ranges of aggregate content versus water content −200 mesh particles, using the same criteria as in Examples 4 and 5.

EXAMPLE 6—SAMPLE BASE MIX FOR −200 MESH CONTENT

−200 Mesh Aggregate

Low Cement

| MIX WT Lb. | CONTENT | ABSL VOL Cu. Ft. | DENSITY Lb/Cu Ft | SG | UNIT WT Water |
|---|---|---|---|---|---|
| 47 | Cement | 0.2391 | 196.56 | 3.15 | 62.4 |
| 0 | Fly Ash | 0 | 139.776 | 2.24 | 62.4 |
| 2450 | Aggregate | 14.8162 | 165.36 | 2.65 | 62.4 |
| 745 | $H_2O$, Base Mix | 11.9391 | 62.4 | 1 | 62.4 |
| 0.0 | Foam | 0.0000 | 2.3712 | 0.038 | 62.4 |

Base Mix Volume: 26.9744 Cu. Ft.

EXAMPLE 7—SAMPLE BASE MIX FOR −200 MESH CONTENT

−200 Mesh Aggregate

High Cement

| MIX WT Lb. | CONTENT | ABSL VOL Cu. Ft. | DENSITY Lb/Cu Ft | SG | UNIT WT Water |
|---|---|---|---|---|---|
| 752 | Cement | 3.8258 | 196.56 | 3.15 | 62.4 |
| 0 | Fly Ash | 0 | 139.776 | 2.24 | 62.4 |
| 1910 | Aggregate | 11.5506 | 165.36 | 2.65 | 62.4 |
| 725 | $H_2O$, Base Mix | 11.6186 | 62.4 | 1 | 62.4 |
| 0.0 | Foam | 0.0000 | 2.3712 | 0.038 | 62.4 |

Base Mix Volume: 26.9949 Cu. Ft.

In Examples 6 and 7, the aggregate content varies from 2450 lbs to 1910 lbs, while water varies from 745 lbs to 725 lbs for the same range. The variation in water content is small because the cement particles and the aggregate are substantially the same size, with the same water requirements.

The water content of the mixture is dependent upon the surface area of the dry ingredients. For example, very fine particles have more surface area than larger particles, thus requiring a greater amount of water for wetting. The following two examples show mixes with identical cement content.

EXAMPLE 8—SAMPLE BASE MIX FOR WATER CONTENT

Gravelly Sand

Optimum Moisture=5%

| MIX WT Lb. | CONTENT | ABSL VOL Cu. Ft. | DENSITY Lb/Cu Ft | SG | UNIT WT Water |
|---|---|---|---|---|---|
| 225 | Cement | 1.1447 | 196.56 | 3.15 | 62.4 |
| 0 | Fly Ash | 0 | 139.776 | 2.24 | 62.4 |
| 0 | Bentonite | 0 | 168.48 | 2.7 | 62.4 |
| 3669 | Aggregate | 22.1880 | 165.36 | 2.65 | 62.4 |
| 229 | $H_2O$, Base Mix | 3.6699 | 62.4 | 1 | 62.4 |
| 0.0 | Foam | 0.0000 | 2.3712 | 0.038 | 62.4 |

Base Mix Volume: 27.0025 Cu. Ft

EXAMPLE 9—SAMPLE BASE MIX FOR WATER CONTENT

Mill Tailings at 200 Mesh

Optimum Moisture=30%

| MIX WT Lb. | CONTENT | ABSL VOL Cu. Ft. | DENSITY Lb/Cu Ft | SG | UNIT WT Water |
|---|---|---|---|---|---|
| 225 | Cement | 1.1447 | 196.56 | 3.15 | 62.4 |
| 0 | Fly Ash | 0 | 139.776 | 2.24 | 62.4 |
| 2298 | Aggregate | 13.8970 | 165.36 | 2.65 | 62.4 |
| 746 | $H_2O$, Base Mix | 11.9551 | 62.4 | 1 | 62.4 |
| 0.0 | Foam | 0.0000 | 2.3712 | 0.038 | 62.4 |

Base Mix Volume: 26.9968 Cu. Ft.

The aggregates in each have identical specific gravities, but Example 8 is fine mill tailings and Example 9 is a coarser gravelly sand. The greatly increased surface area of the smaller material accounts for the significant increase in water content needed to achieve the same volume. The typical optimum moisture contents of 5% for the sand and 30% for the mill tailings illustrate the significant effect that material type has on mix proportioning. There is a difference of 517 lbs of water per cubic yard between the two mixes.

The third component is a surfactant, often diluted in water. Such surfactants are commercially produced products, often a blend of non-ionic, cationic and anionic types. From the commercial products available, a selection is made according to temperature, pH, particle size and specific gravity of the matrix being expanded. The selected surfactant will determine the cell size and permeability of the foam. The dilute surfactant is pumped through a foam generator to create a stiff foam, optimally with a weight range of approximately 25 to 30 grams per liter or an equivalent density of about 1.56 to 2.50 pcf. A foam weight of up to about 40 grams per liter is operable and may be desirable for certain applications such as mitigating segregation of coarser aggregate in the mix. The amount of foam added to the mix design is variable over a wide range and depends upon the result desired. Two possible expansions, representative of approximate low and high ends, respectively, of the expansion range, would be these:

1. A 5% expansion of a fine sand and low cement mix for use as a flowable fill for back-filling a trench. The foam addition would increase fluidity and create a high density, low porosity product.

2. A 200% expansion of a fine sand and high cement mix for use as a mine void fill material. The high foam addition would create an exceptionally flowable, low density and high porosity mixture that would enable a large quantity of fill material to be placed from a single location. The high cement content would provide for sufficient strength and fast set-up time, while being economically offset by the highly increased volume.

The ingredients are combined and applied according to the following steps. First, the cement components, water, and aggregate are mixed, for example in a drum type mixer, trommel or pug mill. The water content is contingent on the surface area of the dry ingredients, although sufficient water should be added to thoroughly disperse the dry ingredients and create a homogeneous mixture.

Second, the foam is added to the mixture in the proper proportion to increase the volume of the mix. The expansion range is from about 5% to about 200% by dry density of the final product. The foam creates in the finished product a large open cell structure, with cell sizes ranging from about 10 to about 100 microns. The cells cause the product to be relatively water permeable, but the cells also relieve internal hydraulic pressures. Thus, by the addition of foam to increase the volume of the mixture, the product gains resistance to repeated freeze-thaw cycles, while meeting ultimate strength requirement criteria.

Third, the product is ready to be placed where needed. The cellular soil cement can be poured out of mixers or pumped through conduits to the proposed location for use. The product requires little or no dispersion or leveling with hand tools to achieve final grade. Upon setting, the product achieves a strength from 15 to 2500 psi, which is suitable for a wide variety of applications. However, for most typical formulations, the product can be removed by the use of normal digging equipment such as a backhoe, so it is practical to place the product over pipelines or in areas where spot removal might be anticipated. The strength of the product is variable as a function of cement content, percentage expansion (foam content), and to a lesser degree, aggregate size and type. The following examples disclose strength based on formula variation, with aggregate material held constant for all examples.

EXAMPLE 10—SAMPLE MIX FOR STRENGTH DUE TO FORMULA

Native Material With Some Organics—Silty Sand

20 Psi

| MIX WT Lb. | CONTENT | ABSL VOL Cu. Ft. | DENSITY Lb/Cu Ft | SG | UNIT WT Water |
|---|---|---|---|---|---|
| 188 | Cement | 0.9565 | 196.56 | 3.15 | 62.4 |
| 0 | Fly Ash | 0 | 139.776 | 2.24 | 62.4 |
| 2547 | Aggregate | 17.3691 | 146.64 | 2.35 | 62.4 |
| 541 | $H_2O$, Base Mix | 8.6699 | 62.4 | 1 | 62.4 |
| 44.8 | Foam | 18.8934 | 2.3712 | 0.038 | 62.4 |

Base Mix Volume: 26.9954 Cu. Ft.
Desired Expansion: 70%
Desired Volume: 45.8922 Cu.
Foam Volume: 18.8968 Cu. Ft.
Expanded Volume: 45.8888 Cu. Ft.

EXAMPLE 11—SAMPLE MIX FOR STRENGTH DUE TO FORMULA

Native Material With Some Organics—Silty Sand

300 Psi

| MIX WT Lb. | CONTENT | ABSL VOL Cu. Ft. | DENSITY Lb/Cu Ft | SG | UNIT WT Water |
|---|---|---|---|---|---|
| 188 | Cement | 0.9565 | 196.56 | 3.15 | 62.4 |
| 0 | Fly Ash | 0 | 139.776 | 2.24 | 62.4 |
| 2547 | Aggregate | 17.3691 | 146.64 | 2.35 | 62.4 |
| 541 | $H_2O$, Base Mix | 8.6699 | 62.4 | 1 | 62.4 |
| 19.2 | Foam | 8.0972 | 2.3712 | 0.038 | 62.4 |

Base Mix Volume: 26.9954 Cu. Ft.
Desired Expansion: 30%
Desired Volume: 35.0940 Cu. Ft.
Foam Volume: 8.0986 Cu. Ft.
Expanded Volume: 35.0926 Cu. Ft.

EXAMPLE 12—SAMPLE MIX FOR STRENGTH DUE TO FORMULA

Native Material With Some Organics—Silty Sand

150 Psi

| MIX WT Lb. | CONTENT | ABSL VOL Cu. Ft. | DENSITY Lb/Cu Ft | SG | UNIT WT Water |
|---|---|---|---|---|---|
| 564 | Cement | 2.8694 | 196.56 | 3.15 | 62.4 |
| 0 | Fly Ash | 0 | 139.776 | 2.24 | 62.4 |
| 2210 | Aggregate | 15.0709 | 146.64 | 2.35 | 62.4 |
| 565 | $H_2O$, Base Mix | 9.0545 | 62.4 | 1 | 62.4 |
| 96.0 | Foam | 40.4858 | 2.3712 | 0.038 | 62.4 |

Base Mix Volume: 26.9948 Cu. Ft.
Desired Expansion: 150%
Desired Volume: 67.4869 Cu. Ft.
Foam Volume: 40.4921 Cu. Ft.
Expanded Volume: 67.4806 Ct. Ft.

EXAMPLE 13—SAMPLE MIX FOR STRENGTH DUE TO FORMULA

Native Material With Some Organics—Silty Sand

2500 Psi

| MIX WT Lb. | CONTENT | ABSL VOL Cu. Ft. | DENSITY Lb/Cu Ft | SG | UNIT WT Water |
|---|---|---|---|---|---|
| 752 | Cement | 3.8258 | 196.56 | 3.15 | 62.4 |
| 0 | Fly Ash | 0 | 139.776 | 2.24 | 62.4 |
| 2071 | Aggregate | 14.1230 | 146.64 | 2.35 | 62.4 |
| 565 | $H_2O$, Base Mix | 9.0545 | 62.4 | 1 | 62.4 |
| 25.6 | Foam | 10.7962 | 2.3712 | 0.038 | 62.4 |

Base Mix Volume: 27.0033 Cu. Ft.

Desired Expansion: 40%

Desired Volume: 37.8046 Cu. Ft.

Foam Volume: 10.8013 Cu. Ft.

Expanded Volume: 37.7995 Cu. Ft.

The formula of Example 10 has an approximate strength of 20 psi and would be suitable as a utility trench back-filling material in cold regions where permafrost exists. The purpose of utilizing this formulation would be to reduce heat transfer from buried utilities to the permafrost to prevent freeze-thaw heaving and resulting damage to overlying road surfaces. This is a relatively low in cement, high expansion formulation.

The formula of Example 11 has an approximate strength of 300 psi and would be suitable as a flowable fill in a utility trench where the material would achieve an over night set sufficient to work on with men and equipment the next day. This is a relatively low cement, low expansion formulation.

The formula of Example 12 has an approximate strength of 150 psi and would be suitable for back-filling mine related voids to prevent subsidence. This is a high cement, high expansion formulation.

The formula of Example 13 has an approximate strength of 2500 psi and would be suitable for constructing a shock absorbing ventilation barrier in a mine. This is a high cement, low expansion formulation.

One of the chief uses for the product is as a soil cement for use as a pavement sub-base. A difficult problem in using soil cements as a pavement sub-base material is their susceptibility to freeze-thaw cycles. The problem is believed to arise, in part, from the gradation of whatever soil is utilized. Soil cements cannot be made impermeable to moisture penetration. Some soils such as clays and silts absorb large quantities of water. When these soils are used to make soil cements, they become susceptible to freeze-thaw cycles, since no mechanism exists within the material to dissipate the internal pressure created by freezing water. Further, the process used in creating and placing typical soil cements also is difficult and time consuming. Preparing the soil for use with a soil cement typically requires that the soil be as close as possible to laboratory optimum moisture content. Further, placing the typical soil cement generally requires compaction to achieve the required beating capabilities.

The use of a pregenerated foam to produce a network of large, interconnected cells in the product overcomes these problems of prior-known soil cements. The addition of a foamed admixture to the cement and aggregate mixture provides a homogeneous network of thin walled air chambers. This network has the ability to dissipate internal hydraulic pressures created by the freeze-thaw cycle and poorly graded or water-absorbing materials like clays. The foam itself is not stabilized, with the result that the final product will contain large, interconnected cells, such that the product is permeable by moisture. In contrast, a stabilized foam would produce impermeable walls between cells. The foam also allows for creation of a homogeneous soil and cement mixture and contributes to substantially increased weather resistance and durability in the product, even at lower ranges of cement content. In addition, the pre-foam reduces capillary channeling during setting.

The product is self-leveling, which eliminates the equipment and labor associated with compaction and minimizes placement costs. Typical soil cements of the prior art are produced in a process of removal and replacement of native soils, by mixing those native soils at optimum moisture content with relatively small quantities of cement. The resulting soil and cement mixture of the prior art is placed in the desired location and requires mechanical compaction to achieve strength. The present invention does not require use of native soils, although their use would be acceptable, and can utilize a variety of potentially available sources for use as aggregate in the foamed soil cement mix. Regardless of the aggregate source, placement precludes compaction. The foamed cement product can be discharged directly from a continuous mixing apparatus, transit mixer, or pumped and discharged from a hose or pipe to areas where equipment access is prohibited. The mixture, once placed, obtains a set.

A further aspect of the present invention is that, in certain applications, waste materials such as mill tailings can be used for the aggregate fraction of the product, thereby reducing costs and providing for disposal of the waste. Mill tailings from mining operation, expansive or collapsing unstable soils, and commercial aggregates all are potential sources for incorporation into a foamed soil cement mix.

The industrial applicability of the invention includes a wide variety of uses, some of which are described in the following examples. As noted above, the product is well-suited for use as a pavement sub-base. This use requires removal of native soil and replacement with the product. After the product has set, the road surface is placed over the sub-base.

Another usage is in back-filling of underground mine related voids. Left unsupported, these voids can lead to surface subsidence. This problem can be eliminated or mitigated by remote filling such voids with soil cement, which can be accomplished in abandoned mines even when access is limited or non-existent. The soil cement can be used for this purpose in a highly expanded formulation, and the density and strength can be adjusted as necessary by selecting an appropriate formulation. The following examples disclose formulations suitable for mine void filling:

EXAMPLE 14—SAMPLE MIX FOR MINE VOID FILLING

Native Material With Some Organics—Silty Sand

Low Density Mix—Dry Voids

The formulation of Example 12 is suitable for filling mine voids. In addition to the data provided in Example 12, the formulation has the following properties:

Weight of Base Mix: 3339.0 Lbs.
Weight of Expanded Mix: 3435.0 Lbs.
Base Mix Wet Density: 123.691 Lbs./Cu. Ft.
Expanded Wet Density: 50.8988 Lbs./Cu. Ft.

EXAMPLE 15—SAMPLE MIX FOR MINE VOID FILLING

Native Material With Some Organics—Silty Sand

Low Density Mix—Wet Voids

| MIX WT Lb. | CONTENT | ABSL VOL Cu. Ft. | DENSITY Lb/Cu Ft | SG | UNIT WT Water |
|---|---|---|---|---|---|
| 564 | Cement | 2.8694 | 196.56 | 3.15 | 62.4 |
| 0 | Fly Ash | 0 | 139.776 | 2.24 | 62.4 |
| 2210 | Aggregate | 15.0709 | 146.64 | 2.35 | 62.4 |
| 565 | $H_2O$, Base Mix | 9.0545 | 62.4 | 1 | 62.4 |
| 32.0 | Foam | 13.4953 | 2.3712 | 0.038 | 62.4 |

Base Mix Volume: 26.9948 Cu. Ft.
Desired Expansion: 50%
Desired Volume: 40.4921 Cu. Ft.
Foam Volume: 13.4974 Cu. Ft.
Expanded Volume: 40.4900 Ct. Ft.
Weight of Base Mix: 3339.0 Lbs.
Weight of Expanded Mix: 3371.0 Lbs.
Base Mix Wet Density: 123.691 Lbs./Cu. Ft.
Expanded Wet Density: 83.2507 Lbs./Cu. Ft.

In Examples 14 and 15, the base formulations, other than foaming, are identical. The density and strength are the variance between the two mixes, based on the quantity of foam added. The lower density mixture of Example 14 is lighter than water and would be suitable for falling dry mine voids. The higher density mixture of Example 15 is heavier than water and would be more suitable for filling wet or water filled mine voids.

The aggregate portion of the mix can be selected from a variety of materials to produce a cost effective mix design. For example, the aggregate may be selected from indigenous soil or waste materials, such as mine refuse, mill tailings, or fly ash. Some typical applications to mine related voids include abandoned or active mine slope back-filling; abandoned mine workings back-filling; back-filling voids that threaten residential or commercial structures, roadways, or other surface improvements; back-filling subsidence cavities; shaft caps and plugs; adit and other engineered mine opening closures; and shock absorbing constructed support pillars for longwall mining, or other mine areas requiring yielding support.

The soil cement can be utilized as a fall material; which can be pumped to difficult areas. It is suited to fall voids where equipment access is prohibited or excessively costly and high strength is undesirable. The characteristics of the soil cement would be desirable in a pipeline bed, for trench back-filling, void back-filling in established but eroded pipeline beds and utility corridors, and as structural support around foundations and under flat work. The density and strength can be varied to suit a wide variety of conditions, including sufficiently low strength to allow for later removal with excavating equipment.

EXAMPLE 16—SAMPLE MIX FOR DIG-ABILITY

Native Material With Some Organics—Silty Sand

300 Psi—Can Be Excavated

| MIX WT Lb. | CONTENT | ABSL VOL Cu. Ft. | DENSITY Lb/Cu Ft | SG | UNIT WT Water |
|---|---|---|---|---|---|
| 188 | Cement | 0.9565 | 196.56 | 3.15 | 62.4 |
| 0 | Fly Ash | 0 | 139.776 | 2.24 | 62.4 |
| 2547 | Aggregate | 17.3691 | 146.64 | 2.35 | 62.4 |
| 541 | $H_2O$, Base Mix | 8.6699 | 62.4 | 1 | 62.4 |
| 32.0 | Foam | 13.4953 | 2.3712 | 0.038 | 62.4 |

Base Mix Volume: 26.9954 Cu. Ft.
Desired Expansion: 50%
Desired Volume: 40.4931 Cu. Ft.
Foam Volume: 13.4977 Cu. Ft.
Expanded Volume: 40.4907 Cu. Ft.

In general, mixtures that are low in cement content, or that have been sufficiently expanded at a given cement content, can be excavated easily. The formulation of Example 16 would be a suitable trench back-filling material and could be removed, even under frozen conditions, with typical excavating equipment such as a rubber tire backhoe. The "dig-ability" of a material is relative. A formulation similar to Example 16 still could be excavated at a lower expansion rate, and correspondingly, excavation would be made easier at a higher expansion rate. The ease of excavation can be adjusted depending upon the degree of importance attached to this feature, since other characteristics of the material change along with the dig-ability, as indicated by the other examples.

The material is suitable for placement out of a mixer, or with a pump in areas of limited access. Some other examples of applications include filling voids behind existing tunnel structures; filling voids underlying existing concrete slabs to prevent settlement and potential slab replacement; back-filling underground solution cavities associated with dams and tailings impoundments, and naturally occurring solution cavities; filling underground fuel storage tanks and associated pipeline corridors for inplace abandonment; falling voids around existing pipelines and utility corridors; providing low strength pipeline bedding material; and void filling around building foundations.

Another industrial application of the soil cement is for soil stabilization, such as in areas of unstable soils where settlement, slope failure, erosion, and swelling occur. A typical solution might be to excavate and back fill with another material as a soil replacement. The present soil cement can be used to stabilize poor soils by incorporating them into the cellular soil cement mix and then back-filling. Some specific examples of suitable applications are incorporating existing poor soils into weather resistant cellular soil cement to stabilize slopes and fills behind retaining walls; incorporation and stabilization of poor soils beneath bridge piers and piles; incorporation and stabilization of poor soils beneath railroad beds and roadways; incorporation and stabilization of expansive or collapsing soils around residential and commercial building foundations. The initial result of these applications is that the soil will be stabilized. In addition, it is quite likely that the indigenous soil can be used as the aggregate without need for importation of other fill. Further benefits, some of which were noted previously, are that the typical compaction step is eliminated, the soil cement will be highly resistant to freeze-thaw conditions, and the mixture easily is placed directly from a mixer or with a pump in limited access areas. Still another advantage, chiefly notable when the cement is used at a basement foundation, is that it provides insulation and protection from freeze-thaw conditions.

A further industrial application is in tunnel annulus grouting or mine entry back-filling and as backpack material. In tunnel applications this soil cement is exceptionally suitable for filling the annular space between the tunnel finer and the tunnel host rock, or between an interior pipeline and the tunnel liner. The light weight and flowability of the soil cement enables it to be pumped or to be placed by gravity.

In active mining situations, the soil cement is useful is solving other back-filling problems. Whether used with commercial aggregates, indigenous soils or mine or mill tailings, the soil cement can be utilized as a back-filling material for void spaces overlying arch-supported, lined mine entries, portals, and other locations such as fault zones, where unstable roof conditions exist. The result is a complete void filling when the soil cement is placed with a pump, such that there is roof contact and additional support to the entire unstable area. The light weight of the product reduces the load on structural supports, while the energy absorbing nature of the cellular structure mitigates shock from roof falls and reduces potential for further failure in caving zones. A peripheral benefit is the ability to use indigenous soils or mine waste for cost efficiency and disposal of wastes. Further, the product is environmentally safe, non-polluting, and has no fire potential. Finally, the product is resistant to freeze-thaw cycles, which can be present in mines, especially near mine openings.

The product also has industrial applicability in forming ventilation barriers in active mines. The product is highly durable with good resistance to shock, such as from blasting. Particular advantages include ease of placement; cellular structure to absorb shock due to blasting and ground movement, and resistance to cracking, spalling and other physical deterioration; and light weight to reduce form loading. In this application as well, the product can utilize indigenous soils or tailings from mine or mill operations to reduce costs and dispose of waste materials.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

We claim:

1. A weather resistant cellular soil cement product, comprising a mixture- of:
   (a) a base mix containing:
      (1) cementitious component in the quantity range from 47 to pounds per cubic yard of base mix;
      (2) aggregate in the size range from gravelly sand to minus 200 mesh particles;
      (3) water in quantity sufficient to create a water-to-cementitious component ratio in the range from 0.25 to 20.0 and sufficient to wet the aggregate;
      wherein the components of said base mix are proportioned to form a volume equal to one cubic yard; and
   (b) surfactant, formed into an aqueous foam having a density in the range from 1.56 to 2.5 pounds per cubic foot;
   wherein said foam is unstabilized and defines pores within the product, such that upon setting of the product, the pores are interconnected.

2. The product of claim 1, wherein said cementitious component is selected from the group consisting of portland cement and class C fly ash and mixtures thereof.

3. The product of claim 2, wherein said cementitious component is in a concentration of about 47 pounds per cubic yard of base mix.

4. The product of claim 2, wherein said cementitious component is in a concentration of about 752 pounds per cubic yard of base mix.

5. The product of claim 2, wherein said cementitious component comprises portland cement and class C fly ash, the latter being in a quantity range of at least 10 percent of the cementitious content.

6. The product of claim 1, wherein the aggregate comprises gravelly sand.

7. The product of claim 1, wherein the aggregate comprises minus 200 mesh particles.

8. The product of claim 1, wherein said surfactant is selected from the group consisting of: anionic, cationic and non-ionic surfactants.

9. The product of claim 1, wherein said foam is mixed with the cement, aggregate, and water in quantity sufficient to reduce the density of the final product to the range from about 130 lbs/cu. ft. to about 45 lbs./cu. ft.

* * * * *